United States Patent
McGrew et al.

(10) Patent No.: US 9,237,015 B2
(45) Date of Patent: Jan. 12, 2016

(54) COMPACT AND EFFICIENT COMMUNICATION SECURITY THROUGH COMBINING ANTI-REPLAY WITH ENCRYPTION

(71) Applicant: Cisco Technology, Inc., San Jose, CA (US)

(72) Inventors: David McGrew, Poolesville, MD (US); John Foley, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 162 days.

(21) Appl. No.: 14/056,038

(22) Filed: Oct. 17, 2013

(65) Prior Publication Data
US 2015/0033014 A1    Jan. 29, 2015

Related U.S. Application Data

(60) Provisional application No. 61/857,717, filed on Jul. 24, 2013.

(51) Int. Cl.
*H04L 9/32* (2006.01)
*H04L 9/30* (2006.01)
*H04L 29/06* (2006.01)

(52) U.S. Cl.
CPC .............. *H04L 9/30* (2013.01); *H04L 63/0435* (2013.01); *H04L 63/123* (2013.01); *H04L 63/1466* (2013.01)

(58) Field of Classification Search
CPC ..... H04L 9/30; H04L 63/0435; H04L 63/123; H04L 63/1466
See application file for complete search history.

(56) References Cited

U.S. PATENT DOCUMENTS

| | | | |
|---|---|---|---|
| 8,370,921 B2* | 2/2013 | Duan et al. ................ 726/15 |
| 2004/0205332 A1* | 10/2004 | Bouchard ........... H04L 63/0485 713/153 |
| 2007/0083923 A1* | 4/2007 | Fluhrer ............... H04L 63/1466 726/12 |
| 2008/0095368 A1* | 4/2008 | Iida ..................... H04L 63/0272 380/259 |

(Continued)

OTHER PUBLICATIONS

McGrew, et al. "The security and performance of the Galois/Counter Mode (GCM) of operation." Progress in Cryptology—Indocrypt 2004. Springer Berlin Heidelberg, 2005. pp. 343-355.

(Continued)

*Primary Examiner* — Techane Gergiso
(74) *Attorney, Agent, or Firm* — Edell, Shapiro & Finnan, LLC (57) ABSTRACT

A method of providing anti-replay protection, authentication, and encryption with minimal data overhead is provided. A sender uses an arbitrary-length pseudorandom permutation to encrypt messages that include plaintext and successively increasing sequence numbers, to produce ciphertext messages. The sender transmits the ciphertext messages. A receiver receives the ciphertext messages and, for each received ciphertext message, performs the following operations. The receiver decrypts the given ciphertext message to recover plaintext and a candidate sequence number from the message. The receiver determines if the candidate sequence number is in any one of multiple acceptable sequence number windows having respective sequence number ranges that are based on at least one of a highest sequence number previously accepted and a last sequence number that was previously rejected, as established based on processing of previously received ciphertext messages.

18 Claims, 7 Drawing Sheets

(56) References Cited

U.S. PATENT DOCUMENTS

| | | | | |
|---|---|---|---|---|
| 2009/0158417 A1* | 6/2009 | Khanna | ............... | H04L 63/1466 726/12 |
| 2009/0319776 A1* | 12/2009 | Burch et al. | .................. | 713/155 |
| 2010/0306538 A1* | 12/2010 | Thomas et al. | ............... | 713/168 |
| 2012/0042096 A1* | 2/2012 | Wu | ............................. | 709/238 |
| 2012/0174216 A1* | 7/2012 | Vukovic et al. | ................. | 726/22 |
| 2014/0281530 A1* | 9/2014 | Song et al. | .................... | 713/168 |

OTHER PUBLICATIONS

McGrew, et al., "The security of the extended codebook (XCB) mode of operation." Selected Areas in Cryptography, Springer, Berlin, Heidelberg, Aug. 2007, 17 pages.

McGrew, et al., "An Interface and Algorithms for Authenticated Encryption," Network Working Group, Standards Track, Request for Comments: 5116, Jan. 2008, pp. 1-23.

Dworkin, "Recommendation for Block Cipher Modes of Operation: The CCM Mode for Authentication and Confidentiality," NIST Special Publication 800-38C, May 2004, 27 pages.

Dworkin, "Recommendation for Block Cipher Modes of Operation: Galois/Counter Mode (GCM) and GMAC," NIST Special Publication 800-38D, Nov. 2007, 39 pages.

Extended European Search Report, in European Application No. 14178240.9, mailed Jan. 22, 2015, 7 pages.

Huang et al., "An Anti-Replay Window Protocol with Controlled Shift", Computer Communications and Networks, Proceedings of 10th International Conference, Oct. 2001, pp. 242-247.

Zhao et al., "Analysis and Improvement of IPSec Anti-Replay Window Protocol", Computer Communications and Networks, ICCN 2003, Proceedings of the 12th International Conference, Oct. 2003, pp. 553-558.

* cited by examiner

COMPACT AND EFFICIENT COMMUNICATION SECURITY THROUGH COMBINING ANTI-REPLAY WITH ENCRYPTION

CROSS-REFERENCE TO RELATED APPLICATIONS

This application claims the benefit of U.S. Provisional Application No. 61/857,717, filed Jul. 24, 2013, the entire content of which is incorporated herein by reference.

TECHNICAL FIELD

The present disclosure relates to secure network communications.

BACKGROUND

Cryptographic security for communication protocols adds data overhead to the protocols that it protects, and it is highly desirable to minimize the extent of that data overhead. Many communication protocols are designed to minimize the amount of data on the network. This is the case for Secure Real-time Transport Protocol (RTP), which commonly carries payloads as short as 20 bytes, and it is especially important for low-power wireless scenarios, such as those defined by IEEE 802.15, in which the maximum packet size is around 100 bytes.

Anti-replay protection is an essential part of communications security, as are confidentiality (through encryption) and message authentication. Anti-replay protection is usually provided by incorporating a sequence number in each message, and including that sequence number in the part of the message that is authenticated. This basic technique is used in Transport Layer Security (TLS), Encapsulating Security Payload (ESP), Authentication Header (AH), IEEE 802.11i, and other protocols.

Encryption algorithms typically have an Initialization Vector (IV), and message authentication requires an Integrity Check Value (ICV) (also sometimes called an Authentication Tag or Message Authentication Code (MAC)). Thus, a typical communications security protocol includes an IV, an ICV, and a sequence number. An IV can be 8-16 bytes, an ICV is often 12-16 bytes, and a sequence number is often 4 bytes, for a total of 24-36 bytes of overhead.

Some communication security protocols omit part of the sequence number, and rely on the receiver's ability to correctly guess the omitted part. This is done in Secure RTP and in ESP with the "extended sequence number" facility. However, this can create synchronization problems between the sender and receiver, especially in multiple-receiver scenarios and late-joiner scenarios, both of which occur in SRTP and can occur in ESP.

DESCRIPTION OF EXAMPLE EMBODIMENTS

Overview

A method of providing anti-replay protection, authentication, and encryption with minimal data overhead is provided. A sender uses an arbitrary-length pseudorandom permutation to encrypt messages that include plaintext and successively increasing sequence numbers, to produce ciphertext messages. The sender transmits the ciphertext messages. A receiver receives the ciphertext messages and, for each received ciphertext message, performs the following operations. The receiver decrypts the given ciphertext message to recover plaintext and a candidate sequence number from the message. The receiver determines if the candidate sequence number is in any one of multiple acceptable sequence number windows having respective sequence number ranges that are based on at least one of a highest sequence number previously accepted and a last sequence number that was previously rejected, as established based on processing of previously received ciphertext messages. The receiver accepts the candidate sequence number if it is determined to be in any one of the acceptable sequence number windows and otherwise rejects the candidate sequence number. The receiver accepts the recovered plaintext if the candidate sequence number is accepted and rejects the plaintext if the candidate sequence number is rejected.

Example Embodiments

Most communication security protocols provide anti-replay service, in addition to providing confidentiality and message authentication. In a replay attack, the attacker records one or more messages as they are transmitted, then later injects one or more of these messages into the communication channel. If there is no anti-replay protection that is provided, then the receiver(s) will accept these messages, regardless of whether or not they are encrypted and/or authenticated, since they are valid messages created with the appropriate secret key. A replay attack allows an attacker to manipulate the post-decryption plaintext. Thus, anti-replay protection is an essential part of communications security. It is usually provided by incorporating a sequence number in each message, and including that sequence number in the part of the message that is authenticated. This is referred to as the Authenticated Sequence Number (ASN) method; its use is widespread.

In the ASN method, each message contains a sequence number and an authentication tag generated by a message authentication code. (In some cases, authenticated encryption is used; these methods also generate authentication tags.) Thus, the additional data that must be carried in each message in order to provide security includes both a sequence number and an authentication code.

One goal for a communication security protocol is to minimize the amount of data that must be transmitted. The per-message overhead of a communication security protocol is the number of bytes that must be transmitted to send a plaintext message, over and above the number of bytes in that plaintext message. The overhead of a protocol is the per-message overhead, averaged over many messages for typical traffic. This goal is especially important in wireless communication, because the transmission of data has a very significant power cost, and the shorter that a message is, the more likely that it is to avoid interference and thus be successfully received. Importantly, studies about the use of cryptography to protect wireless communications reveal that the power cost of transmission and reception of data far outweighs the power cost of the cryptographic algorithms.

Presented herein is an authenticated encryption and decryption method that incorporates replay protection, which has lower communications overhead than techniques heretofore known. This method is referred to herein as Authenticated Encryption with Replay Protection, or AERO. It eliminates the sequence number, and replaces the authentication tag with data that provides for both the authentication and replay protection. This data is very slightly longer than the authentication tag that it replaces, assuming equivalent security levels.

DEFINITIONS AND BACKGROUND

The following is a review of the particular encryption methods that are used in AERO. An arbitrary length permutation, or ALP, is a reversible function that accepts an input with an arbitrary length. It is a permutation in the sense that, since it is reversible, it defines a permutation of all of the elements that have a particular length. A pseudorandom arbitrary length permutation is an arbitrary length permutation that also accepts a secret key as an input, and has the property that, if the key is chosen uniformly at random, then it is difficult to distinguish from an arbitrary length permutation that was chosen uniformly at random from the set of all such functions. In mathematical notation, a pseudorandom ALP that has a k-bit key and accepts inputs with lengths between $l_{min}$ and $l_{max}$ consists of an encryption function $\epsilon_{ALPA}: \{0,1\}^k \times \{0,1\}^n \times \{0,1\}^a \rightarrow \{0,1\}^n$ and $\mathcal{D}_{ALPA}: \{0,1\}^k \times \{0,1\}^n \times \{0,1\}^a \rightarrow \{0,1\}^n$ such that $\epsilon(K,D(K,P,A),A)=P$ for all $K \in \{0,1\}^k$, for all $P \in \{0,1\}^n$ and all $n \in [n_{min}, n_{max}]$ and $a \in [a_{min}, a_{max}]$.

The Extended Codebook (XCB) mode of operation for the Advanced Encryption Standard (AES), defined in IEEE standard 1619.2, is a pseudorandom ALPA.

Authenticated Encryption with Associated Data

An algorithm that provides authenticated encryption with associated data, or AEAD, is an encryption method that authenticates the plaintext, and also authenticates some associated data. An AEAD scheme consists of an encryption function and a decryption function. The latter function either returns the plaintext, if the authentication check is passed, or otherwise returns a symbol FAIL that indicates an authentication failure.

AERO is a stateful authenticated encryption method. There has been little formal work in this area, though there has been work on stateful message authentication, in particular as a way to improve the security of message authentication codes that would otherwise be vulnerable to repeat forgery attacks.

Anti-Replay Protection

Typical communication security protocols provide anti-replay service using the Authenticated Sequence Number (ASN) technique; ESP, AH, SRTP, 802.1AE, 802.11i, SSL, TLS, DTLS, and SSH all use a variant of this method. A sequence number is incorporated in each message that is sent, and that field is included in the part of the message that is authenticated. The sequence number fields of successive messages are set to successive numbers. After receiving and verifying the authenticity of a particular message, the receiver checks that the sequence number in the message is distinct from all previously accepted sequence numbers. If it is distinct, then the sequence number is accepted and the message is accepted as well; otherwise, both the sequence number and the message are rejected. If the messages are delivered in order, then the receiver need only store the last accepted sequence number, and compare this value to the sequence number field to perform the anti-replay check. If the messages are potentially delivered out of order, then the anti-replay checking process must take this into account. An efficient way to do this is to have the receiver store a bitmask M along with an integer $s_{max}$ that represents the highest sequence number that has been accepted, with the convention that $M_i$ is equal to one if the sequence number $s_{max}-i$ has been accepted, and is equal to zero otherwise. The value of $s_{max}$ is initially set to zero, and the receiver checks and advances the sequence number and bitmask as needed. The complete anti-replay checking process is detailed in Algorithm 3, and the initialization for the sender and receiver processes are detailed in Algorithms 1 and 2, in which the length of the bitmask M is denoted as b. The number of bits in the sequence number is denoted as t.

---
Algorithm 1 ASNsenderInit( ) ASN sender initialization)
---
Set $s_{max}$ to zero.
---
Algorithm 2 ASNreceiverInit( ) (ASN receiver initialization)
---
Set $s_{max}$ to w.
Set the bitmask M to the all-zero value.
---

---
Algorithm 3 ASNcheck(s) (ASN checking of the sequence number s)
---
```
Input: Sequence number s ∈ [0,2^s− 1]
Output: ACCEPT or REJECT
    if s = 0 then
        return REJECT
    end if
    if s > s_max then
        d ← s − s_max
        if d < b then
            M << d
            M[1] ← 1
        else
            M ← all zeros
            M[1] ← 1
        end if
        s_max ← s
        return ACCEPT
    end if
    d ← s_max − s
    if d ≥ b then
        return REJECT
    end if
    if M[d] = 1 then
        return REJECT
```

-continued

| Algorithm 3 ASNcheck(s) (ASN checking of the sequence number s) |
|---|
| end if<br>M[d] ← 1<br>return ACCEPT |

Implicit Sequence Numbers

To reduce the overhead, some communication security protocols use the idea of an implicit sequence number, in which all or part of the sequence number are not transmitted. The receiver estimates all or part of the sequence number of a message, based on the ordering of the message. The implicit part of the sequence number is included in the authenticated part of the message, and if the receiver's estimate of the sequence number is correct, then the authentication verification step will pass, and otherwise it will fail. If the authentication step passes, then the anti-replay checking can proceed as usual. This process is used by SRTP and ESP.

Implicit sequence numbers work well in some scenarios, but not in others. If there are multiple receivers, then a receiver that starts receiving a stream of messages after the transmission has started will not know the current value of the implicit sequence number. That value will need to be communicated to the receiver, or the receiver will need to determine that value through trial and error. Both methods add undesirable complexity. In addition, implementation complexity of implicit sequence numbers makes it undesirable for implementation in hardware; both IEEE 802.11 and IEEE 802.1AE avoid this technique.

The AERO Method

Figure 1:
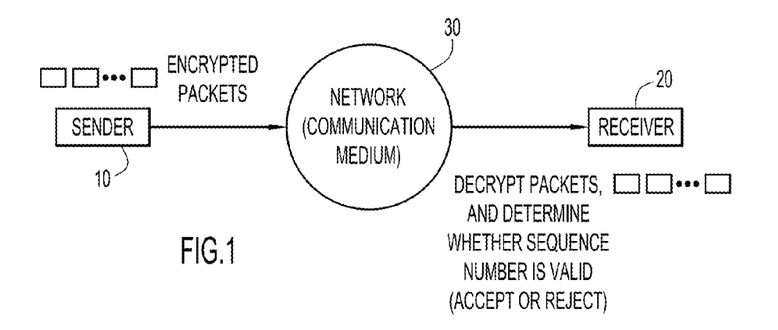
FIG. 1 is a block diagram generally illustrating a communication environment in which a sender employing the techniques presented herein sends encrypted packets to a receiver and the receiver decrypts and evaluates packets for anti-replay issues.

FIG. 1 shows a simple block diagram of a system in which the AERO method may be used. A sender device ("sender") 10 has packets (also referred to herein as "messages") to send to a receiver device ("receiver") 20, by way of a network or communication medium 30. The sender 10 encrypts packets and sends them, via network/communication medium 30, to the receiver 20. The receiver 20 decrypts the packets and determines whether a sequence number is valid for a packet in order to accept or reject the packet.

Initialization

The initialization of the AERO method on the sender (encryption) and receiver (decryption) sides are shown below in Algorithms 4 and 5.

| Algorithm 4 AERO encryption initialization. |
|---|
| Input: Key K' ∈ $(0,1)^k$<br>K ← K'<br>ASNsenderInit( ) |

| Algorithm 5 AERO decryption initialization. |
|---|
| Input: Key K' ∈ $(0,1)^k$<br>K ← K'<br>ASNreceiverInit( )<br>r ← 0 |

Figure 2A:
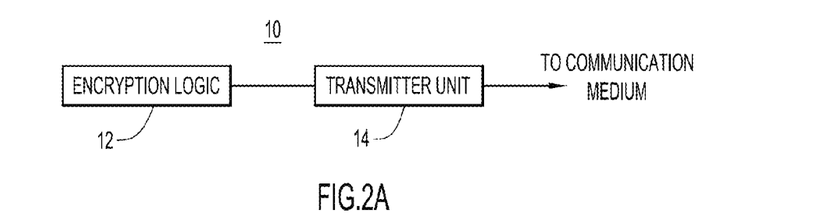
FIG. 2A is a block diagram of a sender device configured to generate and send encrypted packets according to the techniques presented herein.
Figure 2B:
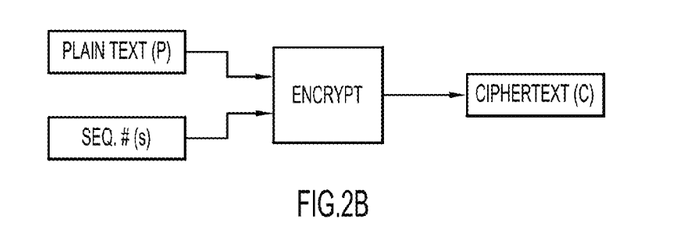
FIG. 2B is a flow chart depicting the operations performed at the sender device.

Reference is now made to FIGS. 2A and 2B, for purposes of explaining the operations performed at the sender. As shown in FIG. 2A, the sender 10 includes encryption logic 12 and a transmitter unit 14. The encryption logic 12 may take the form of firmware (digital logic gates) in fixed or programmable form, or (software) instructions that are executed by a processor (e.g., microprocessor). The transmitter unit 14 is any suitable transmitter that is configured to transmit packets across the physical communication medium of interest, whether wireless or wired (electrical or optical).

The AERO method works as follows. The sender maintains a t-bit sequence number s, which is initially equal to zero. The receiver maintains the bit-mask M and highest accepted sequence number $s_{max}$ as used in the ASN method; the AERO algorithms share the value $s_{max}$ with Algorithms 1, 2 and 3 (above), and those algorithms are used as subroutines by the AERO methods. The receiver also maintains a t-bit value r that holds the last rejected sequence number.

FIG. 2B is a high level flow diagram for the operations performed by the encryption logic 12. The sender maintains a t-bit sequence number s, which is initially equal to zero. To encrypt a plaintext P, the sender concatenates the sequence number s with P, then encrypts the result with an arbitrary-length pseudorandom permutation (such as the AES-XCB mode defined in IEEE 1619.2), using a secret key K. The resulting ciphertext C is the entire message used in the security protocol; it incorporates encryption, message authentication, and anti-replay sequencing data.

The AREO encryption is further defined in Algorithm 6 below.

| Algorithm 6 AERO encryption. |
|---|
| Input: Plaintext P ∈ $(0,1)^a$, associated data A ∈ $(0,1)^a$<br>Output: Ciphertext C ∈ $(0,1)^{n+1}$<br>C ← $\in_{ALPA}$(K,P∥s,A)<br>s ← s + 1<br>return C |

The encryption and decryption algorithms use parameters v and w, which define the length of the "windows" of sequence numbers that will be accepted, even though they are slightly larger than expected.

With reference to FIGS. 3A-3D and 4 the receiver side is further described.

Figure 3A:
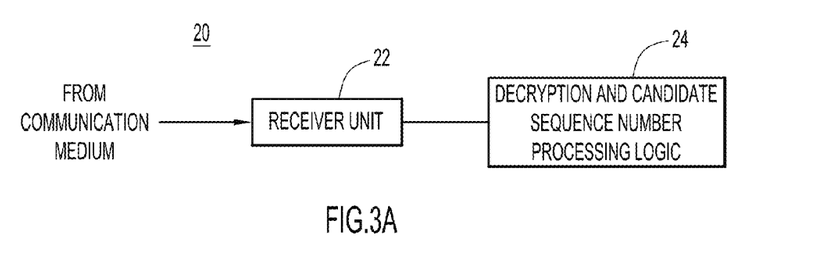
FIG. 3A is a block diagram of a receiver device configured to receive, decrypt and determine the validity of received packets by evaluating their sequence numbers.

As shown in FIG. 3A, the receiver 20 includes a receiver unit 22 and decryption and candidate sequence number processing logic 24. The receiver unit 22 may be any suitable receiver depending on the particular communication medium used. The candidate sequence number processing logic 24 may be embodied in hardware or software, much like encryption logic 12 in the sender 10.

Figure 3B:
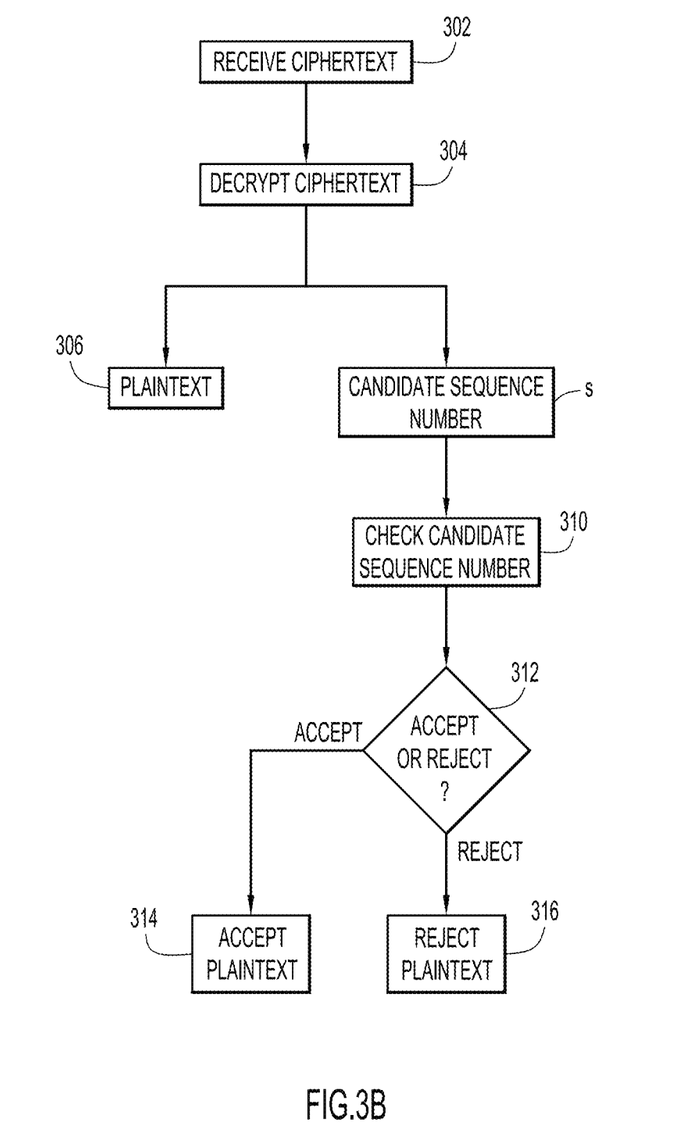
FIG. 3B is a flow chart generally depicting operations performed at the receiver device.
Figure 3C:
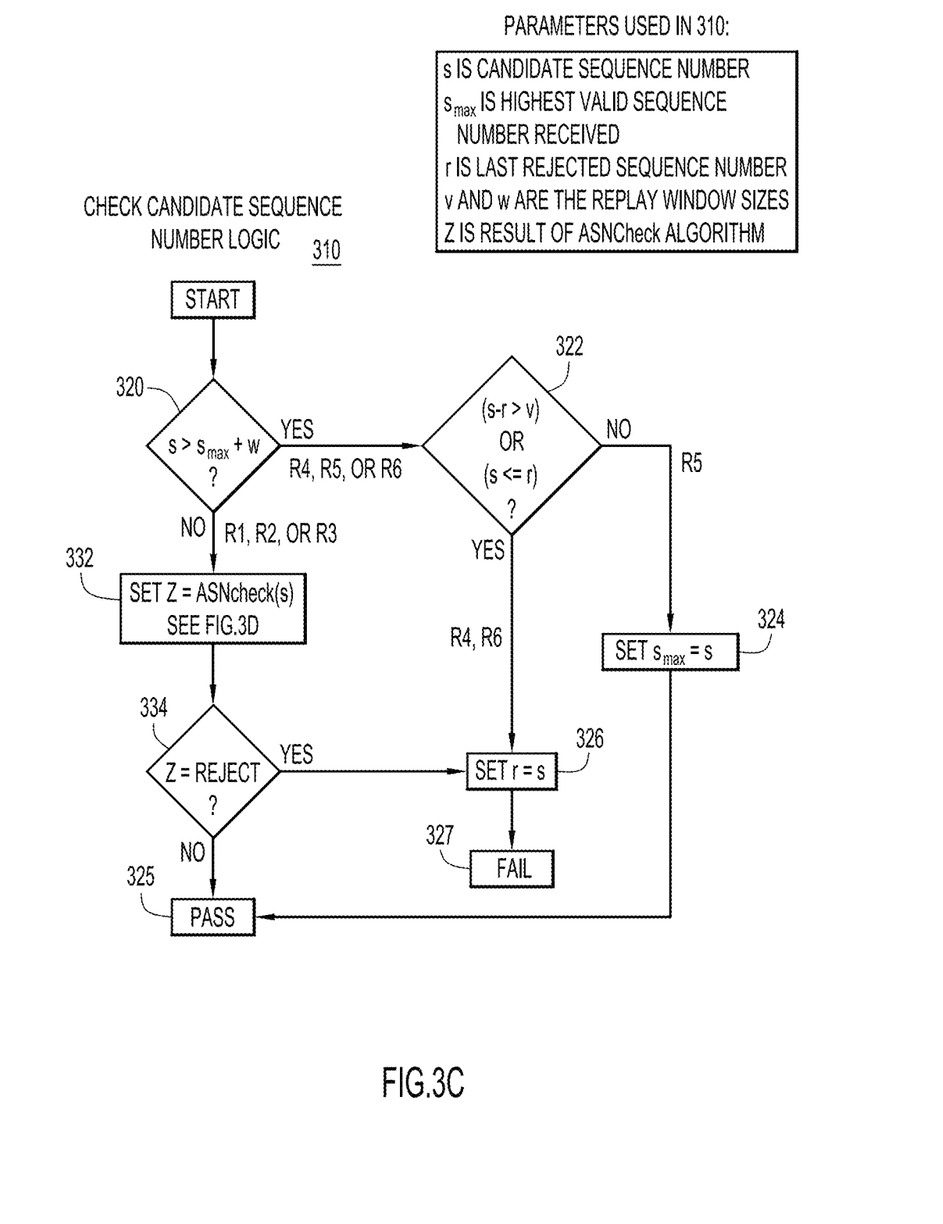
FIG. 3C is a flow chart depicting a process to evaluate the candidate sequence number of a packet at the receiver device to determine packet validity.
Figure 3D:
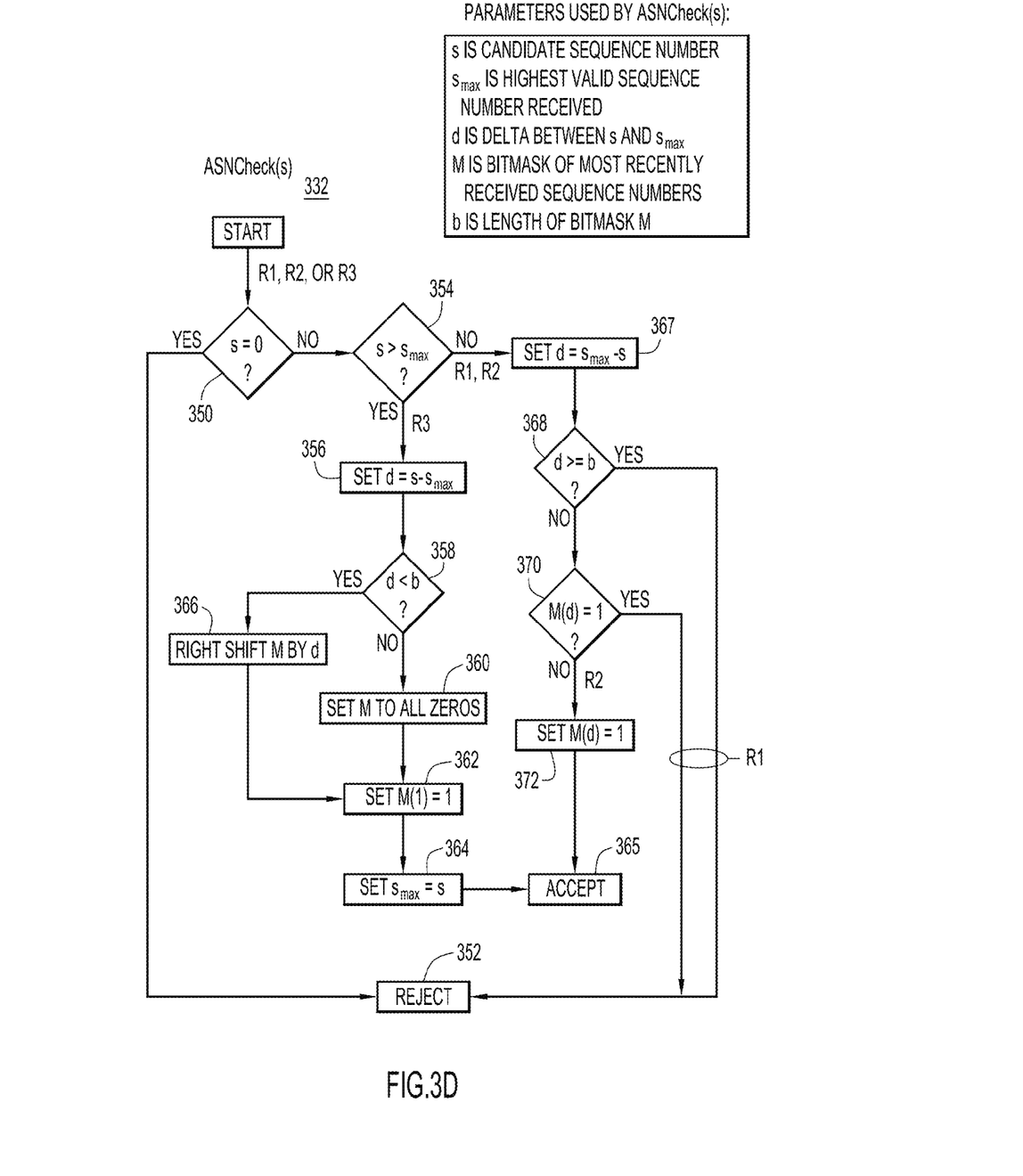
FIG. 3D is a flow chart depicting a process to check the Authenticated Sequence Number (ASN) of a packet at the receiver device to determine its validity.

The general operation of the candidate sequence number processing logic 24 is described with respect to FIG. 3B, which is expanded upon in the further operations depicted FIGS. 3C and 3D. The operations depicted in FIG. 3C are also generally depicted by Algorithm 7 below in pseudo-code.

| Algorithm 7 AERO decryption. |
|---|
| Input: Ciphertext C ∈ $(0,1)^{n+1}$, associated data A ∈ $(0,1)^a$<br>Output: Plaintext P ∈ $(0,1)^n$ or the symbol FAIL,<br>P∥s ← $D_{ALPA}$(K,C,A)<br>if s > $s_{max}$ + w then<br>  if s − r > v or s ≤ r then<br>    r ← s<br>    return FAIL<br>  else<br>    $s_{max}$ ← s<br>    return p<br>  end if<br>else<br>  s ← ASNcheck(s)<br>  if z = REJECT then<br>    r ← s<br>    return FAIL |

-continued

Algorithm 7 AERO decryption.

```
    else
        return P
    end if
end if
```

AERO can use an encryption method other than an arbitrary-length pseudorandom permutation, as long as the encryption method operates such that the Candidate Sequence number produced by the decryption operation (see FIG. 3B) is an unpredictable function of the Ciphertext. That is, an attacker that is able to choose Ciphertext values is unable to predict what Candidate Sequence number will be produced by the values that it chooses. An arbitrary-length pseudorandom permutation has this property, but some other encryption methods have this property as well. For instance, an online cipher is an encryption method such that, if an attacker modifies the ith byte of the Ciphertext, then bytes i, i+1, i+2, . . . of the output of the decryption operation will be pseudorandom and unpredictable. Thus, an online cipher has the property useful to the AERO methods since the Candidate Sequence number will be unpredictable.

The value s in Algorithm 7 is the candidate sequence number. AERO decryption incorporates a way to re-synchronize a sender and a receiver in case w or more messages are lost in transit. To process a ciphertext C, the receiver first decrypts C with K, then interprets the final t bits of the result as a candidate sequence number s.

The logic that compares the current candidate sequence number s to the last rejected candidate sequence number r enables re-synchronization. If this re-synchronization process occurs, then at least one valid message will be rejected by this algorithm. This is undesirable; however, it is acceptable, considering that a loss of at least w messages has occurred.

With reference to FIG. 3B, at 302, logic 24 receives a sequence of ciphertext messages assumed to include encrypted plaintext and encrypted sequence numbers representative of successively increasing sequence numbers. Logic 24 repeats remaining operations 304-316 in FIG. 3B for each of the received ciphertext messages in sequence.

At 304, logic 24 decrypts the given ciphertext message to recover plaintext 306 and a candidate sequence number s;

At 310 (CheckCandidateSeq #), logic 24 checks whether candidate sequence number s is valid or invalid. To do this, logic 24 determines if the candidate sequence number s is in any one of multiple acceptable sequence number ranges or windows. A given range or window includes a starting candidate sequence number of the range, an ending sequence number of the range, and successive candidate sequence numbers extending from the starting candidate sequence number to the ending sequence number. The acceptable sequence number windows have respective sequence number ranges that are based on at least one of a highest sequence number previously accepted $s_{max}$ and a last sequence number that was previously rejected r, as established based on processing of previously received ciphertext messages, i.e., previous iterations through operations 304-316. That is, each sequence number range may be based on only $s_{max}$, only r, or, alternatively, a combination of both $s_{max}$ and r.

At 312, candidate sequence number s is accepted (i.e., deemed valid) if it is in any of the acceptable sequence number windows as determined at 310, and otherwise rejected (i.e., deemed invalid).

If at 312 candidate sequence number s was accepted, then, at 314, plaintext 306 is also accepted.

If at 312 candidate sequence number s was not accepted (i.e., was rejected), then at 316 plaintext 306 is rejected.

Figure 4:
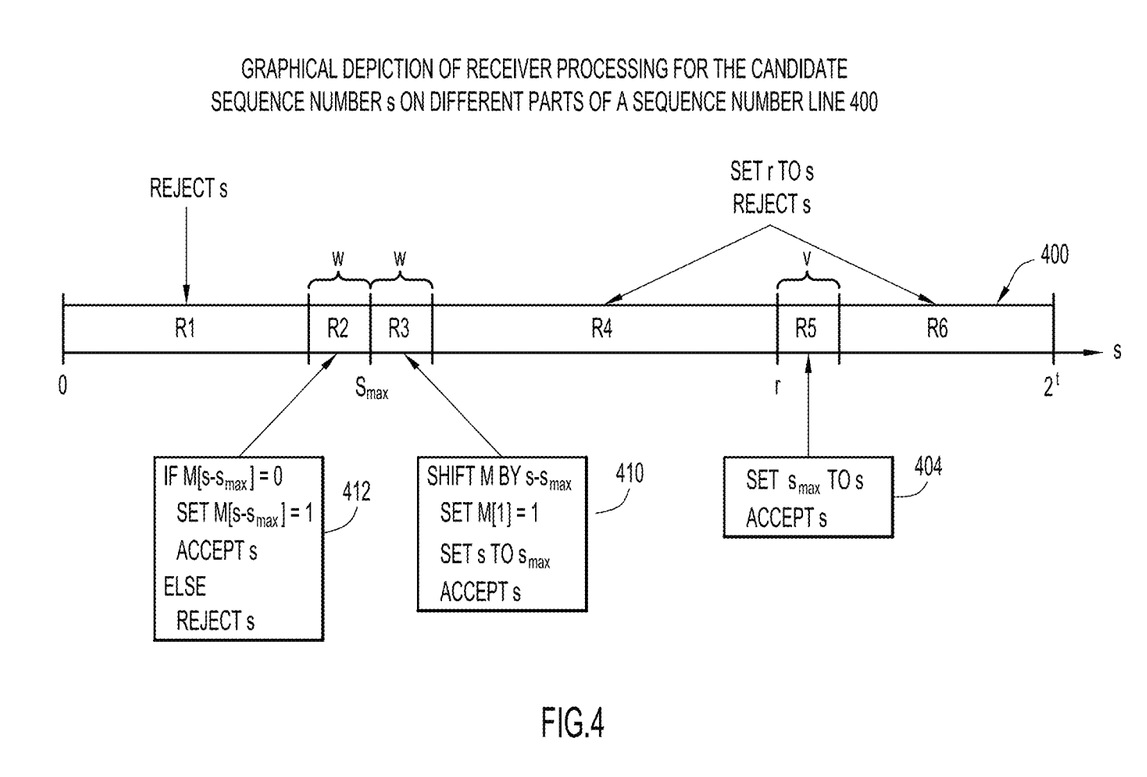
FIG. 4 is a diagram graphically depicting the analysis performed at the receiver device to determine whether to accept or reject a packet based on its candidate sequence number.

Reference is now made to FIG. 4, which is a graphical illustration helpful in describing receiver processing at operation 310 (CheckCandidateSeq #) for candidate sequence number s falling on different parts of a number line 400 indicating possible candidate sequence numbers recovered from decrypt operation 304. Number line 400 shows possible candidate sequence numbers ranging from 0 to $2^t$, including exemplary, spaced apart values for $s_{max}$ and last rejected candidate sequence number r resulting from previous iterations through operations 304-316 of FIG. 3. Number line 400 is divided into successive contiguous candidate sequence number ranges R1-R6, of which R2, R3, and R5 represent first, second, and third acceptable sequence number windows (also referred to more simply as first, second, and third "acceptable windows") of respective sizes w, w, and v. The remaining ranges R1, R4, and R6 represent unacceptable sequence number ranges. Acceptable candidate sequence number window R2 is below and adjacent to $s_{max}$, while window R3 is above and adjacent to $s_{max}$. Acceptable sequence number window R5 begins with r. Therefore, as can be seen in FIG. 4, acceptable sequence number windows (ranges) R2, R3, and R5 are positioned on number line 400 such that R2 and R3 are based on $s_{max}$ and R5 is based on r.

With reference to number line 400, operation 310 (CheckCandidateSeq #) determines if candidate sequence number s is in any one of first acceptable window R2, second acceptable window R3, and third acceptable window R5. If it is, candidate sequence number s is accepted at operation 315. On the other hand, if operation 310 determines s is not in any of the windows R2, R3, and R4, i.e., s is in one of candidate sequence number ranges R1, R4, and R6, then s is rejected at operation 312.

Also depicted in FIG. 4 are pseudo-code for operations 404, 410, and 412 corresponding to each of the first, second, and third acceptable sequence number windows R2, R3, and R5, respectively. The pseudo-code for operations 404, 410, and 412 are further described below.

Turning next to FIG. 3C, a flow chart expanding on operation 310 (Check Candidate Seq. #) is shown. The flow chart of FIG. 3C is now described also with reference to FIG. 4.

Operation 310 (CheckCandidateSeq #) uses the following parameters:
  i. s—candidate sequence number (#);
  ii. $s_{max}$—highest sequence number previously accepted (also referred to as the "highest accepted sequence number" and "highest valid sequence number received");
  iii. r—last sequence number previously rejected (also referred to as the last rejected sequence number);
  iv. w, w, and v—window sizes of acceptable sequence number windows R2, R3, and R5, respectively; and
  v. Z—result flag Z (ACCEPT/REJECT s) returned from ASNcheck(s).

At 320, logic 24 determines if s is above second acceptable sequence number window R3, i.e., in one of ranges R4, R5, and R6. If it is determined that s is above acceptable window R3, then flow proceeds to operation 322.

At 322, logic 24 determines if s is in one of unacceptable ranges R4 (where s<=r) and R6 (where s-r>v), or in acceptable window R5. If it is determined that s is in acceptable window R5 (i.e., s is valid/acceptable), then flow proceeds to 324 where $s_{max}$ is set equal to s, and then operation 310 terminates at 325 with an indication that s is accepted. Summary logic associated with operations 324 and 325 is depicted at block 404 in FIG. 4. If, on the other hand, it is determined that s is in one of unacceptable ranges R4 and R6 (i.e., s is invalid/unacceptable), then at 326 r is set equal to s, and then flow terminates at 327 with an indication that s is rejected.

Returning again to 320, if it is determined at 320 that s is not above second acceptable sequence number window R3, then it is assumed s is in one of ranges R1, R2, and R3 and flow proceeds to 332 to determine into which of these ranges s falls.

Specifically, at 332, routine ASNcheck(s) is called to determine if s is in first acceptable window R2. Routine ASNcheck(s) returns a result flag Z based on the determination. ASNcheck(s) sets Z=ACCEPT if it is determined that s is in first acceptable window R2, and Z=REJECT if it is determined that s is not in window R2. ASNcheck(s) also uses bitmask M to determine into which range s falls and ASNcheck(s) updates bitmask M based on the determination, as will be described further below in connection with FIG. 3D.

At 334, logic 24 checks the status of result flag Z (either Z=REJECT or Z=ACCEPT) returned from ASNcheck(s) at 332. If Z=REJECT (s is not in acceptable window R2), then flow proceeds to 326 where r is set equal to s, and then operation 310 ends at 327 with an indication that s is rejected. If, instead, Z=ACCEPT (s is in acceptable window R2), then flow proceeds to 325 where operation 310 ends with an indication that s is accepted.

Turning next to FIG. 3D, a flowchart expanding on ASNcheck(s) called at operation 332 is shown. ASNcheck(s) is also referred to herein as the "ASNcheck subroutine." As mentioned above, ASNcheck(s) maintains and uses bitmask M to determine where s falls (in any one of ranges R1, R2, and R3) and also updates the bitmask depending on the determination. As discussed above, bitmask M includes bits or flags in successive bit positions of the bitmask that indicate whether candidate sequence numbers from corresponding, previously received, successive ciphertext messages were accepted or rejected. Bitmask M has a bit width of b.

At 350, logic 24 determines if s=0. If it is determined that s=0, then flow proceeds to 352 where ASNcheck(s) sets Z=REJECT (s is rejected) and ASNcheck(s) ends. If it is determined that s≠0, then flow proceeds to 354.

At 354, logic 24 determines if s>$s_{max}$ (i.e., if s is in second acceptable window R3 or in one of ranges R1 and R2). If s>$s_{max}$ and, therefore, in second acceptable window R3, then flow proceeds to 356 where d is set equal to a difference between candidate sequence number s and highest previously accepted candidate number $s_{max}$ (i.e., d=s−$s_{max}$).

From 356, flow proceeds to 358-362 where bitmask M is updated according to the value of d as follows. These operations ensure that bitmask M retains the property that M, is equal to one if the candidate sequence number $s_{max}$−i has been accepted, and is equal to zero otherwise, by shifting or zeroizing (i.e., setting equal to zero) the bits of M as appropriate. Here the value d is the difference between the candidate sequence number and the last accepted sequence number; the bitmask M must be shifted by d in order to maintain that property. Since the bitmask M contains exactly b bits, if d is greater than b, then the bitmask is zeroized, since no sequence numbers between s−b and s have been received, and thus the bitmask should contain only zero bits.

At 358, logic 24 determines if difference d<bitmask width b.

If the test at 358 fails (i.e., d≥b), then flow proceeds from 358 to 360 where all of the bits in bitmask M are set equal to zero, and then to 362 where a first bit of bitmask M (i.e., bit M[1]) is set equal to 1. From 362, flow proceeds to 364 where $s_{max}$ is set equal to s.

If the test at 358 does not fail (i.e., d<b), then flow proceeds from 358 to 366 where the bits of bitmask M are shifted right by d bits. Then, flow proceeds to 362, and then to 364, both of which are described above.

From 364, flow proceeds to 365 where ASNcheck(s) sets Z=ACCEPT to indicate s is to be accepted and ASNcheck(s) ends. Operations 366, 362, 364, and 365 just described are indicated at summary logic block 410 in FIG. 4.

Returning to 354, if it is determined that s in one of ranges R1 and R2, then flow proceeds to 367 where d is set equal to $s_{max}$−s.

From 367, flow proceeds to "test" operations 368 and 370 that perform sequential tests on parameters related to bitmask M (i.e., b and M[d]) in order to determine if s is in range R1. These operations determine if the value s has previously been accepted, or if it is more than b values out of sequence. This is done by checking the value of bitmask bit M[d] if d<b, and by rejecting the value otherwise. In the latter case, s is more than b values out of sequence, while in the former case, the value of M[d] indicates whether or not s was previously accepted.

If either of sequential tests 368 and 370 passes indicating that s is in range R1, then flow proceeds to 352 where ASNcheck(s) sets Z=REJECT to indicate s is to be rejected and ASNcheck(s) ends.

If both of sequential tests 368 and 370 fail indicating that s is in not in range R1 but is, instead, in first acceptable window R2, then flow proceeds to 372 where bitmask bit M[d] is set equal to 1 to indicate the acceptance of s. Flow then proceeds to 365 (discussed above) indicating that s is accepted. Operations 358, 360, 362, 364, 365, and 366 described above are indicated generally at summary logic block 412 in FIG. 4.

The operations of FIGS. 3B, 3C and 3D described above can be summarized, as follows. If s is close to $s_{max}$ then anti-replay checking is done using $s_{max}$ as the highest previously accepted sequence number and M as the bitmask indicating which packets have been previously accepted. If this process indicates that s is a replay, then r is set to s and the processing returns an indication of failure and halts. If s is accepted as not being a replay and s>$s_{max}$, then $s_{max}$ is set to s. If s≥$s_{max}$+w and either s−r>v or s<=r (e.g., s is in range R4 or R6), then r is set to s and the process returns an indication of failure. If s is between r and r+v (i.e., s is in acceptable window R5), then the packet is accepted and $s_{max}$ is set to s. This last step ensures that the receiver will re-synchronize with the sender after a burst of lost messages; a single message will be dropped in the process. If s is accepted, then the process returns the initial bits of the decryption result as the plaintext (that is, all but the last t bits of that value). If the process returns an indication of failure, this means that either there was a replayed message, or a message rejected for being very far out of sequence, or there was an authentication failure.

The system is secure as long as the encryption is a good arbitrary-length pseudorandom permutation. The confidentiality follows directly from the soundness of the encryption process. The authenticity follows from the fact that, if the encryption algorithm is strong, then after decryption, each candidate sequence number s will be indistinguishable from random. There are only 3*w possible values of s that a receiver will accept, and thus the probability of a forgery attempt being successful is no more than $3*w/2^t$.

FIG. 4 can be regarded as an illustration of the authentication strength; an attacker must "hit" one of the first, second, and third acceptable windows R2, R3, and R5 to succeed. Roughly speaking, this technique provides the same security as does an ICV of length L=t−lg(w)−1. Typical parameter values are t=96, w=32, for L=90.

If the arbitrary-length pseudorandom permutation accepts associated data, as does AES-XCB, then the associated data can be processed before the plaintext (by the sender) or before the ciphertext (by the receiver), so that this technique provides authenticated encryption with associated data (see RFC 5116 for definitions).

Figure 5:
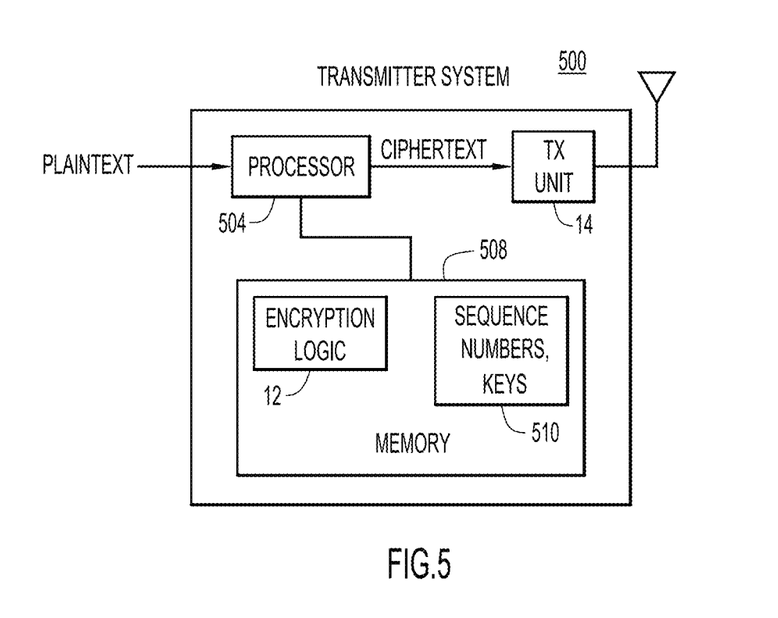
FIG. 5 is a block diagram of an example transmitter system to perform encryption operations.

Reference is now made to FIG. 5, which shows an example transmitter apparatus 500 (corresponding to sender 10 in FIG. 1) configured to perform the encryptions operations described herein to encrypt plaintext into ciphertext. There are numerous possible configurations of transmitter 500 and FIG. 5 is meant to be an example. Transmitter 500 includes transmitter (TX) unit 14 to transmit the ciphertext as described above in connection with FIG. 1, a processor 504, and memory 508. The TX unit 14 may be a network interface unit (e.g., network interface card), part of a wired or wireless transceiver, etc. The processor 504 is a microcontroller or microprocessor, for example, configured to execute software instructions stored in the memory 508. The memory 508 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 508 may comprise one or more computer readable storage media (e.g., a memory device) encoded with software comprising computer executable instructions and when the software is executed (by the processor 504) it is operable to perform the operations described herein. For example, the memory 508 stores or is encoded with instructions for encryption logic 12 to perform the encryption operations described above. In addition, the memory 508 stores encryption keys and sequence numbers (collectively represented at 510) used by encryption logic 12. Again, as described earlier, the encryption operations of encryption logic 12 may be performed by software instructions executed by a processor, e.g., processor 504 as shown in FIG. 5, or by digital logic gates in a fixed logic device (such as an application specific integrated circuit) or programmable logic device (field programmable gate array device, etc.).

Figure 6:
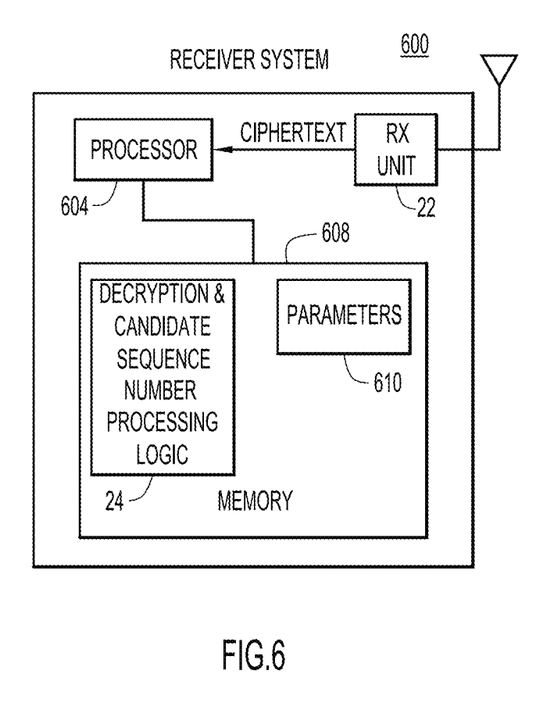
FIG. 6 is a block diagram of an example receiver system to perform decryption and candidate sequence number processing operations.

Reference is now made to FIG. 6, which shows an example receiver apparatus 600 (corresponding to receiver 20 in FIG. 1) configured to perform the decryption and candidate sequence number processing operations described herein. There are numerous possible configurations of receiver 600 and FIG. 6 is meant to be an example. Receiver 600 includes a receiver (RX) unit 22 to receive a communication signal from communication medium 30 and recover ciphertext from the received communication signal as described above in connection with FIG. 2, a processor 604, and memory 608. The processor 604 is a microcontroller or microprocessor, for example, configured to execute software instructions stored in the memory 608. The memory 608 may comprise ROM, RAM, magnetic disk storage media devices, optical storage media devices, flash memory devices, electrical, optical, or other physical/tangible (e.g., non-transitory) memory storage devices. Thus, in general, the memory 608 may comprise one or more computer readable storage media (e.g., a memory device) encoded with software comprising computer executable instructions and when the software is executed (by the processor 604) it is operable to perform the operations described herein. For example, the memory 608 stores or is encoded with instructions for decryption and candidate sequence number processing logic 24 (also shown in FIG. 3A) to perform the operations described above to decrypt the ciphertext and process candidate sequence numbers. In addition, the memory 608 stores parameters 610, including, but not limited to, decryption keys, candidate sequence numbers, and so on used by logic 24 as described herein. The encryption operations of logic 24 may be performed by software instructions executed by a processor, e.g., processor 604 as shown in FIG. 6, or by digital logic gates in a fixed logic device (such as an application specific integrated circuit) or programmable logic device (field programmable gate array device, etc.).

Security

It is assumed that the ALPA scheme used in the AERO method is sound, i.e. for any choice of secret key, an attacker cannot distinguish it from an ALPA encryption chosen uniformly at random. For both AERO and ALPA, the attack model considered is one in which the adversary is able to submit chosen plaintexts and chosen ciphertexts, and do so adaptively.

The soundness of AERO as an encryption method is readily evident. It follows directly from the soundness of the ALPA encryption. Because each invocation of $\epsilon_{ALPA}$ includes a distinct value of the sequence number, each AERO ciphertext is distinct. Thus, AERO encryption meets the strongest definition of confidentiality; in particular, if the same plaintext value is used in multiple invocations of $\epsilon_{ALPA}$, the result will be distinct ciphertext values.

The soundness of AERO authentication follows from the fact that an attacker is highly unlikely to be able to find/derive a ciphertext that will be accepted by the AERO decryption algorithm (denoted $\mathcal{D}_{AERO}$). In a forgery attempt, an attacker submits a ciphertext C and an associated data A to $\mathcal{D}_{AERO}$ that does not match any ciphertext CO and associated data AO that have been output or input (respectively) to the AERO encryption (denoted $\epsilon_{AERO}$). That is, we make the usual assumption that when trying to forge messages, the attacker does not replay valid messages.) Because of the soundness of ALPA decryption (denoted $\mathcal{D}_{ALPA}$), the post-decryption plaintexts are indistinguishable from random values, to an attacker who does not know the secret key. Thus, the attacker will be unable to distinguish s from random, much less control that value. Hence it is suitable to assume that, during a forgery attempt, the value of s in Algorithm 7 is distributed uniformly at random between 0 and $2^t-1$ at the outset of the decryption process. The number of values of s that cause that algorithm to return P is v+2w. Thus the probability that an individual forgery attempt will succeed is at most $(v+2w)2^{-t}$.

The soundness of AERO anti-replay protection is also readily evident. A re-played message will undergo the same anti-replay checking as the ASN method.

A denial of service attack against AERO is no more effective than a denial of service attack against ASN, assuming that the two methods have similar probability of an individual forgery attempt being successful.

The overhead of AERO is t bits, and a single key can be used to send $2^t$ messages.

The ASN method is characterized by the number of bits x in its authentication tag, and the number of bits c in its sequence number. The overhead of this technique is x+c, the forgery probability is at most $2^{-x}$, and a single key can be used to send $2^c$ messages.

To show the benefits of the AERO technique, we consider the situation in which t; x; and c are chosen so that the two methods have identical forgery probabilities, in which case t=x+lg(v+2w). In these cases, t is larger than x by no more than eight bits. The AERO method has less overhead by a factor of c−lg(v+2w), which is 24 bits (three bytes) for ESP.

However, ESP also includes an Initialization Vector in each packet, for another 64 bits (for the CTR, GCM, CCM, and GMAC modes of operation) or 128 bits (for the CBC mode of operation). Thus, AERO can improve on ESP by at least 88 bits (11 bytes).

The current standard for IEEE 802.11i authenticated encryption is the AES-CCMP protocol; it has c=56 and t=64. Using AERO within this protocol would save 48 bits (six bytes), while preserving the strength of the authentication. The bandwidth reduction for wireless is compelling, as described below.

It is less easy to quantify the reduction in overhead for Secure RTP, because that protocol uses implicit sequence numbers and sometimes communicates the entire sequence number. However, there is a significant benefit for using AERO in SRTP: it makes it unnecessary to maintain the implicit sequence number between the sender and receiver. AERO significantly simplifies SRTP for multi-party communication such as media bridges, while having very little additional data expansion. In SRTP, authentication tags are sometimes as short as four bytes. The choice of t=32 for AERO may be undesirably small, because it would result in a forgery probability of about $2^{-24}$ and would restrict the number of packets that could be encrypted with a single key to $2^{32}-1$. It seems safer to use t=40; 48; 64 if bandwidth is highly constrained, and a larger value otherwise.

Wireless Applications

The AERO technique is ideal for secure wireless communication, since the computational cost of the cryptography is significantly lower than the cost of transmitting and receiving data. ALPA ciphers are typically slightly more expensive than conventional encryption techniques, but this minor disadvantage is outshone by the major advantage of reduced communication cost.

For low-power wireless, AERO can save several bytes, which is quite significant for the small frame sizes typical of that domain. For example, the IEEE 802.15.4 use of AES-CCM for link-layer wireless encryption uses a c=32-bit sequence number (the Frame Counter field) and an authentication tag of t∈{32, 64, 128} bits. Using AERO instead would save 24 bits (three bytes), where frame sizes are between 10 and 108 bytes, for a bandwidth saving between 3% and 30%.

There are more modest but still worthwhile savings even for conventional WiFi™ systems. The bandwidth savings of AERO on Internet traffic, 802.11i can be estimated by using the IMIX estimate: 58% of packets have 40 bytes, 33% of packets have 576 bytes, and 8% of packets have 1500 bytes. Assuming that the plaintext packets have the IMIX distribution, the distribution of the lengths of 802.11i AES-CCMP protected frames that are transmitted over the wireless link layer is as follows: 58% of packets have 60 bytes, 33% of packets have 596 bytes, and 8% of packets have 1520 bytes. This gives an average frame size of 353 bytes. In contrast, AERO would have overhead of 14 bytes instead of 20 bytes, giving a frame-length distribution of: 58% of packets have 54 bytes, 33% of packets have 590 bytes, and 8% of packets have 1514 bytes. This gives an average frame size of 347 bytes. Thus, AES-CCMP has nearly 2% more bandwidth overhead than AERO would have. Thus AERO has a modest but worthwhile savings even when applied to Internet trafffic over WiFi.

The bandwidth savings would be even more dramatic for low-power wireless systems such as 802.15, since they have smaller frame sizes. This likely makes AERO well suited for Internet of Things applications.

If AERO is used in a higher-layer protocol such as IPsec, TLS, DTLS, or SSH, it reduces the overhead of those protocols, and thus makes better use of whatever wireless links it may be traversing. In this sense, AERO can be said to be wireless-friendly even when it is used in protocols that are above the link layer.

Misuse Resistance

A desirable property for an encryption method is that of misuse resistance: security should degrade gracefully if the method is used improperly. AERO is an authenticated encryption method that strongly resists misuse. It does not require a nonce input, which makes it simpler to use. In these respects, it addresses the security concerns that have been expressed by the academic community about current authenticated encryption techniques such as Galois/Counter Mode (GCM).

In some scenarios, such as virtual machine environments, it may be impossible to guarantee that the sequence number used in the encryption processes is distinct. In particular, a virtual machine containing a secret key and sequence number may be cloned or duplicated, so that multiple virtual machines are active with the same secret key and sequence number. To protect against this situation, the encryption process can include a random value that is discarded by the receiver. As long as the encryption process uses a good random source for this value, strong confidentiality will ensue. Legitimate messages output by the encryption process may be rejected by the decryption process; note however that this is a communication/system/interoperability problem and not a security problem.

The AERO techniques presented herein have lower bandwidth overhead while providing confidentiality, message authentication and anti-replay protection with strength that is equivalent to that of conventional authenticated encryption with authenticated sequence numbers. Low-power wireless devices (e.g. 802.15.4) can save between 3% and 30% bandwidth, and AERO for 802.11i would lower WiFi transmission and reception costs by roughly 2%. AERO also offers significant simplifications to SRTP, by relieving the architectures that use SRTP of the need to manage and coordinate the implicit sequence number. This is especially appealing for multiparty applications such as conference bridging.

Thus, the AERO techniques provide a highly compact way to provide all of the necessary security services—encryption, authentication, and anti-replay protection—on a message. For example, an IV can be 8-16 bytes, an ICV is often 12-16 bytes, and a sequence number is often 4 bytes, for a total of 24-36 bytes of overhead. AERO can provide security equivalent to a 12 byte ICV with only 12 bytes of overhead. With, for example, a 20-byte payload (as in RTP G.729) the savings in overhead is valuable.

In summary, in one form, a method is provided comprising: receiving a sequence of ciphertext messages that include encrypted plaintext and encrypted sequence numbers representative of successively increasing sequence numbers; and for each received ciphertext message: decrypting the ciphertext message to recover plaintext and a candidate sequence number; determining if the candidate sequence number is in any one of multiple acceptable sequence number windows having respective sequence number ranges that are based on at least one of a highest sequence number previously accepted and a last sequence number that was previously rejected, as established based on processing of previously received ciphertext messages; accepting the candidate sequence number if it is determined to be in any one of the acceptable sequence number windows and otherwise rejecting the candidate sequence number; and accepting the recovered plaintext if the candidate sequence number is accepted and rejecting the plaintext if the candidate sequence number is rejected.

Similarly, an apparatus is provided comprising: a receiver unit configured to receive over a communication network a sequence of ciphertext messages that include encrypted plaintext and encrypted sequence numbers representative of successively increasing sequence numbers; and a processor coupled to the receiver unit, and configured to: decrypt the ciphertext message to recover plaintext and a candidate sequence number; determine if the candidate sequence number is in any one of multiple acceptable sequence number windows having respective sequence number ranges that are based on at least one of a highest sequence number previously accepted and a last sequence number that was previously rejected, as established based on processing of previously received ciphertext messages; accept the candidate sequence number if it is determined to be in any one of the acceptable sequence number windows and otherwise rejecting the candidate sequence number; and accept the recovered plaintext if the candidate sequence number is accepted and reject the plaintext if the candidate sequence number is rejected.

In still another form, provide herein is one or more computer readable storage media encoded with software comprising computer executable instructions operable to: receive a sequence of ciphertext messages that include encrypted plaintext and encrypted sequence numbers representative of successively increasing sequence numbers; and for each received ciphertext message: decrypt the ciphertext message to recover plaintext and a candidate sequence number; determine if the candidate sequence number is in any one of multiple acceptable sequence number windows having respective sequence number ranges that are based on at least one of a highest sequence number previously accepted and a last sequence number that was previously rejected, as established based on processing of previously received ciphertext messages; accept the candidate sequence number if it is determined to be in any one of the acceptable sequence number windows and otherwise rejecting the candidate sequence number; and accept the recovered plaintext if the candidate sequence number is accepted and rejecting the plaintext if the candidate sequence number is rejected.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   receiving a sequence of ciphertext messages that include encrypted plaintext and encrypted sequence numbers representative of successively increasing sequence numbers; and
   for each received ciphertext message:
      decrypting the ciphertext message to recover plaintext and a candidate sequence number;
      determining if the candidate sequence number is in any one of a first sequence number window below and adjacent to a highest sequence number previously accepted, a second sequence number window above and adjacent to the highest sequence number previously accepted, and a third sequence number window above the second window and beginning with a last sequence number that was previously rejected, as established based on processing of previously received ciphertext messages;
      accepting the candidate sequence number if it is determined to be in any one of the first, second, and third sequence number windows and otherwise rejecting the candidate sequence number; and
      accepting the recovered plaintext if the candidate sequence number is accepted and rejecting the plaintext if the candidate sequence number is rejected.

2. The method of claim 1, further comprising:
   if it is determined that the candidate sequence number is not in any of the first, second, and third sequence number windows, then setting the last sequence number previously rejected equal to the equal to the candidate sequence number.

3. The method of claim 1, further comprising:
   if it is determined that the candidate sequence number is in one of the second and third sequence number windows, setting the highest sequence number previously accepted equal to the candidate sequence number.

4. The method of claim 3, further comprising:
   maintaining a bitmask having flags in successive bit positions of the bitmask indicating whether sequence numbers from corresponding, previously received, successive ciphertext messages were accepted,
   wherein if it is determined that the candidate sequence number is in the second sequence number window, shifting the positions of the flags in the bitmask based on a difference between the highest sequence number previously accepted and the candidate sequence number.

5. The method of claim 1, further comprising:
   maintaining a bitmask having flags in successive bit positions of the bitmask indicating whether sequence numbers from corresponding, previously received, successive ciphertext messages were accepted, and
   wherein the determining includes determining if the candidate sequence number is in the first sequence number window based on a comparison of (i) a difference between the highest sequence number previously accepted and the candidate sequence number, and (ii) a number of bits in the bit mask.

6. The method of claim 1, wherein the ciphertext messages are encrypted with an encryption method that operates such that the candidate sequence number produced by the decrypting operation is an unpredictable function of the encrypted plaintext.

7. The method of claim 6, wherein the encryption method uses arbitrary-length pseudorandom permutation.

8. The method of claim 1, further comprising:
   concatenating successive blocks of plaintext with respective ones of successive sequence numbers to produce a sequence of concatenated messages; and
   encrypting the sequence of concatenated messages to produce the sequence of ciphertext messages; and
   transmitting the sequence of ciphertext messages.

9. An apparatus comprising:
   a receiver unit configured to receive over a communication network a sequence of ciphertext messages that include encrypted plaintext and encrypted sequence numbers representative of successively increasing sequence numbers; and
   a processor coupled to the receiver unit, and configured to:
      decrypt the ciphertext message to recover plaintext and a candidate sequence number;
      determine if the candidate sequence number is in any one of a first sequence number window below and adjacent to a highest sequence number previously accepted, a second sequence number window above and adjacent to the highest sequence number previously accepted, and a third sequence number window above the second window and beginning with a last sequence number that was previously rejected, as established based on processing of previously received ciphertext messages;

accept the candidate sequence number if it is determined to be in any one of the first, second, and third sequence number windows and otherwise reject the candidate sequence number; and accept the recovered plaintext if the candidate sequence number is accepted and reject the plaintext if the candidate sequence number is rejected.

10. The apparatus of claim 9, wherein the processor is further configured to:

if it is determined that the candidate sequence number is not in any of the first, second, and third sequence number windows, set the last sequence number previously rejected equal to the equal to the candidate sequence number.

11. The apparatus of claim 9, wherein the processor is further configured to:

if it is determined that the candidate sequence number is in one of the second and third sequence number windows, set the highest sequence number previously accepted equal to the candidate sequence number.

12. The apparatus of claim 11, wherein the processor is further configured to:

maintain a bitmask having flags in successive bit positions of the bitmask indicating whether sequence numbers from corresponding, previously received, successive ciphertext messages were accepted, if it is determined that the candidate sequence number is in the second sequence number window, shift the positions of the flags in the bitmask based on a difference between the highest sequence number previously accepted and the candidate sequence number.

13. The apparatus of claim 9, wherein the processor is further configured to:

maintain a bitmask having flags in successive bit positions of the bitmask indicating whether sequence numbers from corresponding, previously received, successive ciphertext messages were accepted, and determine if the candidate sequence number is in the first sequence number window based on a comparison of (i) a difference between the highest sequence number previously accepted and the candidate sequence number, and (ii) a number of bits in the bit mask.

14. A non-transitory processor readable medium storing instructions that, when executed by a processor, cause the processor to:

receive a sequence of ciphertext messages that include encrypted plaintext and encrypted sequence numbers representative of successively increasing sequence numbers; and for each received ciphertext message:

decrypt the ciphertext message to recover plaintext and a candidate sequence number;

determine if the candidate sequence number is in any one of a first sequence number window below and adjacent to a highest sequence number previously accepted, a second sequence number window above and adjacent to the highest sequence number previously accepted, and a third sequence number window above the second window and beginning with a last sequence number that was previously rejected, as established based on processing of previously received ciphertext messages;

accept the candidate sequence number if it is determined to be in any one of the first, second, and third sequence number windows and otherwise reject the candidate sequence number; and accept the recovered plaintext if the candidate sequence number is accepted and reject the plaintext if the candidate sequence number is rejected.

15. The non-transitory processor readable medium of claim 14, further comprising instructions to cause the processor to:

if it is determined that the candidate sequence number is not in any of the first, second, and third sequence number windows, set the last sequence number previously rejected equal to the equal to the candidate sequence number.

16. The non-transitory processor readable medium of claim 14, further comprising instructions to cause the processor to:

if it is determined that the candidate sequence number is in one of the second and third sequence number windows, set the highest sequence number previously accepted equal to the candidate sequence number.

17. The non-transitory processor readable medium of claim 16, further comprising instructions to cause the processor to:

maintain a bitmask having flags in successive bit positions of the bitmask indicating whether sequence numbers from corresponding, previously received, successive ciphertext messages were accepted, if it is determined that the candidate sequence number is in the second sequence number window, shift the positions of the flags in the bitmask based on a difference between the highest sequence number previously accepted and the candidate sequence number.

18. The non-transitory processor readable medium of claim 14, further comprising instructions to cause the processor to:

maintain a bitmask having flags in successive bit positions of the bitmask indicating whether sequence numbers from corresponding, previously received, successive ciphertext messages were accepted, and wherein the instruction to cause the processor to determine include instructions to cause the processor to determine if the candidate sequence number is in the first sequence number window based on a comparison of (i) a difference between the highest sequence number previously accepted and the candidate sequence number, and (ii) a number of bits in the bit mask.

* * * * *